(12) United States Patent
Huang et al.

(10) Patent No.: US 11,121,907 B2
(45) Date of Patent: Sep. 14, 2021

(54) OPERATION, ADMINISTRATION AND MAINTENANCE OAM DATA TRANSMISSION METHOD AND APPARATUS

(71) Applicant: HUAWEI TECHNOLOGIES CO., LTD., Guangdong (CN)

(72) Inventors: Jing Huang, Shenzhen (CN); Min Zha, Shenzhen (CN); Qiwen Zhong, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 1 day.

(21) Appl. No.: 16/423,858

(22) Filed: May 28, 2019

(65) Prior Publication Data

US 2019/0280913 A1  Sep. 12, 2019

Related U.S. Application Data

(63) Continuation of application No. PCT/CN2017/111980, filed on Nov. 21, 2017.

(30) Foreign Application Priority Data

Nov. 28, 2016 (CN) .......................... 201611064255.X

(51) Int. Cl.
  *H04L 12/24* (2006.01)
  *H04L 12/911* (2013.01)
  *H04L 29/08* (2006.01)
(52) U.S. Cl.
  CPC .............. *H04L 41/06* (2013.01); *H04L 41/00* (2013.01); *H04L 47/82* (2013.01); *H04L 69/323* (2013.01); *H04L 41/02* (2013.01)
(58) Field of Classification Search
  CPC ......... H04L 41/06; H04L 41/00; H04L 47/82; H04L 69/323; H04L 41/02
  See application file for complete search history.

(56) References Cited

U.S. PATENT DOCUMENTS

| | | | | |
|---|---|---|---|---|
| 4,833,673 A | * | 5/1989 | Chao ..................... | H04J 3/1682 370/537 |
| 5,530,699 A | * | 6/1996 | Kline .................. | H04L 12/6418 370/260 |

(Continued)

FOREIGN PATENT DOCUMENTS

| | | |
|---|---|---|
| CN | 101674218 A | 3/2010 |
| CN | 104919815 A | 9/2015 |
| WO | 2009076818 A1 | 6/2009 |

OTHER PUBLICATIONS

Extended European Search Report issued in European Application No. 17873119.6 dated Aug. 7, 2019, 6 pages.

(Continued)

*Primary Examiner* — Tejis Daya
(74) *Attorney, Agent, or Firm* — Fish & Richardson P.C.

(57) ABSTRACT

The present disclosure relates to operation, administration and maintenance (OAM) data transmission methods and apparatus. One example method includes obtaining a first data flow and sending the first data flow. The first data flow includes at least one first OAM data block. The at least one first OAM data block is a code block that carries first OAM data. The first data flow is a data flow obtained by deleting at least one redundant block or at least one second OAM data block from a second data flow and inserting the at least one first OAM data block, or the first data flow is a data flow obtained by modifying at least one second OAM data block in a second data flow. The second data flow is an aggregated data flow. The second OAM data block carries second OAM data.

20 Claims, 10 Drawing Sheets

300

```
┌─────────────────────────────────────────────────────────────┐
│ Obtain a first data flow, where the first data flow includes │
│ at least one first OAM data block, the first OAM data block │
│ is a code block that carries first OAM data, and the first   │
│ data flow is obtained by deleting at least one redundant     │
│ block or at least one second OAM data block from a second    │──── 310
│ data flow and inserting the at least one first OAM data      │
│ block, or the first data flow is obtained by modifying at    │
│ least one second OAM data block in a second data flow; and   │
│ the second data flow is an aggregated data flow, the second  │
│ OAM data block carries second OAM data, and the redundant    │
│ block includes at least one of an idle block and a duplicate │
│ control block                                                │
└─────────────────────────────────────────────────────────────┘
                              │
                              ▼
        ┌──────────────────────────────────────────┐
        │       Send the first data flow           │──── 320
        └──────────────────────────────────────────┘
```

(56) References Cited

U.S. PATENT DOCUMENTS

| | | | | | |
|---|---|---|---|---|---|
| 6,466,592 | B1* | 10/2002 | Chapman | ............. | H04N 21/235 370/537 |
| 6,614,760 | B1* | 9/2003 | Suzuki | ................ | H04L 12/5601 370/244 |
| 6,618,383 | B1* | 9/2003 | Tomlins | .............. | H04L 12/5601 370/395.5 |
| 7,519,728 | B1* | 4/2009 | Yeluri | ..................... | H04L 45/00 370/395.61 |
| 2003/0133509 | A1* | 7/2003 | Yanagihara | .......... | H04N 9/8042 375/240.26 |
| 2004/0246938 | A1* | 12/2004 | Schentrup | ............... | H04W 4/20 370/347 |
| 2005/0099949 | A1* | 5/2005 | Mohan | .................... | H04L 47/10 370/236.2 |
| 2011/0110220 | A1* | 5/2011 | Breslin | ................... | H04L 43/04 370/216 |
| 2011/0249567 | A1* | 10/2011 | Kini | .................... | H04W 92/045 370/241.1 |
| 2013/0010605 | A1* | 1/2013 | Jocha | .................... | H04L 43/026 370/241.1 |
| 2014/0146679 | A1* | 5/2014 | Adams | ................... | H04L 47/32 370/235 |
| 2014/0199069 | A1* | 7/2014 | Garavaglia | ........ | H04Q 11/0071 398/66 |
| 2015/0222533 | A1* | 8/2015 | Birrittella | ............... | H04L 45/74 370/392 |
| 2015/0319057 | A1* | 11/2015 | Jocha | .................... | H04L 43/062 370/241.1 |
| 2016/0043794 | A1* | 2/2016 | Ashrafi | ................ | H04B 7/0617 370/329 |
| 2016/0119076 | A1 | 4/2016 | Gareau et al. | | |
| 2017/0005949 | A1* | 1/2017 | Gareau | ................. | H04L 12/413 |
| 2017/0006360 | A1* | 1/2017 | Gareau | .................... | G06F 13/40 |
| 2017/0093757 | A1* | 3/2017 | Gareau | .............. | H04L 43/0864 |
| 2019/0356557 | A1* | 11/2019 | Burgio | .................... | H04L 43/50 |

OTHER PUBLICATIONS

J. Huang, Ed et al., "Framework and Requirements for GMPLS-based Control of Flexible Ethernet Network; draft-huang-flexe-framework-00," Internet Engineering Task Force; Internet-Draft, XP015115079, Aug. 31, 2016, 19 pages.

IEEE 802.3-2015_SECTION1-6,IEEE Standard for Ethernet,IEEE Std 802.3-2015(Revision of IEEE Std 802.3-2012), Sep. 3, 2015, 4017 pages.

PCT International Search Report and Written Opinion in International Application PCT/CN2017/111980, dated Feb. 23, 2018, 13 pages (With English translation).

\* cited by examiner

300

Obtain a first data flow, where the first data flow includes at least one first OAM data block, the first OAM data block is a code block that carries first OAM data, and the first data flow is obtained by deleting at least one redundant block or at least one second OAM data block from a second data flow and inserting the at least one first OAM data block, or the first data flow is obtained by modifying at least one second OAM data block in a second data flow; and the second data flow is an aggregated data flow, the second OAM data block carries second OAM data, and the redundant block includes at least one of an idle block and a duplicate control block ~ 310

Send the first data flow ~ 320

| Receive a plurality of code blocks, where the plurality of code blocks include at least one OAM data block, and the OAM data block is a code block that carries OAM data | ~ 610 |

| Aggregate the plurality of received code blocks into a first data flow | ~ 620 |

| Delete the at least one OAM data block from the first data flow, and insert at least one redundant block, to obtain a second data flow, where the redundant block includes at least one of an idle block and a duplicate control block | ~ 630 |

| Send the second data flow | ~ 640 |

FIG. 6

OPERATION, ADMINISTRATION AND MAINTENANCE OAM DATA TRANSMISSION METHOD AND APPARATUS

CROSS-REFERENCE TO RELATED APPLICATIONS

This application is a continuation of International Application No. PCT/CN2017/111980, filed on Nov. 21, 2017, which claims priority to Chinese Patent Application No. 201611064255.X, filed on Nov. 28, 2016. The disclosures of the aforementioned applications are hereby incorporated by reference in their entireties.

TECHNICAL FIELD

This application relates to the communications field, and in particular, to an operation, administration and maintenance OAM data transmission method and apparatus.

BACKGROUND

Operation, administration and maintenance (OAM) is a network fault detection tool. A user may enable an Ethernet OAM function on two connected end-to-end devices, to detect a status of a link between the two devices.

Currently, there is no OAM data transmission mechanism in a communications system that uses a flexible Ethernet (FlexE) technology or another Ethernet technology obtained by extending the FlexE technology. Therefore, how to transmit OAM data in the communications system that uses the FlexE technology or the another Ethernet technology obtained by extending the FlexE becomes a technical problem that needs to be resolved.

SUMMARY

Embodiments of this application provide an OAM data transmission method and apparatus, to transmit OAM data in a communications system that uses a FlexE technology or another Ethernet technology obtained by extending the FlexE.

According to a first aspect, an operation, administration and maintenance OAM data transmission method is provided, including:

obtaining a first data flow, where the first data flow includes at least one first OAM data block, the first OAM data block is a code block that carries first OAM data, and the first data flow is a data flow obtained by deleting at least one redundant block or at least one second OAM data block from a second data flow and inserting the at least one first OAM data block, or the first data flow is a data flow obtained by modifying at least one second OAM data block in a second data flow; and the second data flow is an aggregated data flow, the second OAM data block carries second OAM data, and the redundant block includes at least one of an idle block and a duplicate control block; and sending the first data flow.

In this embodiment of this application, OAM data can be transmitted in a communications system that uses a FlexE technology or another Ethernet technology obtained by extending the FlexE.

A relative sequence of valid data blocks in the first data flow and the second data flow is fixed.

In this embodiment of this application, OAM data is carried in an aggregated data flow, so that OAM data transmission crossing multi-hop nodes can be implemented.

In some possible implementations, the first data flow is the data flow obtained by deleting the at least one redundant block or the at least one second OAM data block from the second data flow and inserting the at least one first OAM data block, and the obtaining a first data flow includes:

receiving a plurality of code blocks, where the plurality of code blocks include the at least one redundant block or the at least one second OAM data block;

aggregating the plurality of received code blocks into the second data flow;

generating the at least one first OAM data block; and deleting the at least one redundant block or the at least one second OAM data block from the second data flow, and inserting the at least one first OAM data block, to obtain the first data flow.

In some possible implementations, the deleting the at least one redundant block or the at least one second OAM data block from the second data flow, and inserting the at least one first OAM data block includes:

deleting the at least one redundant block or the at least one second OAM data block from the second data flow, and periodically inserting the at least one first OAM data block.

The periodically inserting the at least one first OAM data block facilitates a receive end in determining, in time, whether a communication link is faulty.

In some possible implementations, the deleting the at least one redundant block from the first data flow, and periodically inserting the at least one first OAM data block includes:

deleting one redundant block and inserting one first OAM data block within one period.

In some possible implementations, the first data flow is the data flow obtained by modifying the second OAM data block in the second data flow; and the obtaining a first data flow includes:

receiving a plurality of code blocks, where the plurality of code blocks include the at least one second OAM data block;

aggregating the plurality of received code blocks into the second data flow; and modifying some or all second OAM data blocks in the second data flow, to obtain the first data flow.

In some possible implementations, the modifying OAM data carried in the at least one second OAM data block in the second data flow includes:

determining a target field that is in the at least one second OAM data block in the second data flow and that needs to be modified; and modifying OAM data in the target field.

In some possible implementations, the first OAM data and the second OAM data each include a faulty-node identifier and an error flag.

In some possible implementations, the code block is a 64B/66B code block.

In some possible implementations, the first data flow is the data flow obtained by deleting the at least one redundant block from the second data flow and inserting the at least one first OAM data block, and the code block is a code block that is based on a coding format corresponding to a media independent interface MII; and the sending the first data flow includes:

performing 64B/66B coding processing on the first data flow, to obtain a third data flow; and sending the third data flow.

According to a second aspect, an operation, administration and maintenance OAM data transmission method is provided, including:

receiving a plurality of code blocks, where the plurality of code blocks include at least one OAM data block, and the OAM data block is a code block that carries OAM data;

aggregating the plurality of received code blocks into a first data flow;

deleting the at least one OAM data block from the first data flow, and inserting at least one redundant block, to obtain a second data flow, where the redundant block includes at least one of an idle block and a duplicate control block; and sending the second data flow.

In this embodiment of this application, OAM data can be transmitted in a communications system that uses a FlexE technology or another Ethernet technology obtained by extending the FlexE.

The first data flow is an aggregated data flow, and a relative sequence of valid data blocks in the first data flow is fixed.

In this embodiment of this application, OAM data is carried in an aggregated data flow, so that OAM data transmission crossing multi-hop nodes can be implemented.

In some possible implementations, the code block is a 64B/66B code block.

According to a third aspect, an OAM data transmission apparatus is provided, where the apparatus is configured to implement the method in the first aspect or any possible implementation of the first aspect.

Specifically, the apparatus may include units configured to perform the method in the first aspect or any possible implementation of the first aspect.

According to a fourth aspect, an OAM data transmission apparatus is provided, where the apparatus is configured to implement the method in the second aspect or any possible implementation of the second aspect.

Specifically, the apparatus may include units configured to perform the method in the second aspect or any possible implementation of the second aspect.

According to a fifth aspect, an OAM data transmission apparatus is provided, including: a processor, a receiver, a transmitter, a memory, and a bus system, where the processor, the receiver, the transmitter, and the memory are connected by using the bus system, the memory is configured to store an instruction or code, and the processor is configured to execute the instruction or the code that is stored in the memory, so that the OAM data transmission apparatus performs the method in the first aspect or any possible implementation of the first aspect.

According to a sixth aspect, an OAM data transmission apparatus is provided, including: a processor, a receiver, a transmitter, a memory, and a bus system, where the processor, the receiver, the transmitter, and the memory are connected by using the bus system, the memory is configured to store an instruction or code, and the processor is configured to execute the instruction or the code that is stored in the memory, so that the OAM data transmission apparatus performs the method in the second aspect or any possible implementation of the second aspect.

According to a seventh aspect, a computer readable storage medium is provided, where the computer readable storage medium stores a program, and the program enables an OAM data transmission apparatus to perform the method in the first aspect or any possible implementation of the first aspect.

According to an eighth aspect, a computer readable storage medium is provided, where the computer readable storage medium stores a program, and the program enables an OAM data transmission apparatus to perform the method in the second aspect or any possible implementation of the second aspect.

BRIEF DESCRIPTION OF DRAWINGS

FIG. 3 is a schematic flowchart of an OAM data transmission method according to an embodiment of this application;

FIG. 6 is a schematic flowchart of an OAM data transmission method according to another embodiment of this application;

DESCRIPTION OF EMBODIMENTS

The following describes the technical solutions in the embodiments of this application with reference to the accompanying drawings in the embodiments of this application.

The embodiments of this application may be applied to a communications system that uses an Ethernet technology or another network technology. For example, the Ethernet technology may be an Ethernet technology that is obtained by extending a flexible Ethernet (FlexE) technology and in which transmission crossing multi-hop devices can be implemented. For example, the existing FlexE technology may be combined with a cross forwarding or packet forwarding function, to implement an Ethernet technology in which transmission crossing multi-hop devices can be implemented. It should be noted that the Ethernet technology in the embodiments of this application may be the FlexE technology, may be another Ethernet technology obtained by extending the FlexE technology, or may be a conventional Ethernet technology.

The FlexE defined by the Optical Internetworking Forum (OIF) is an interface technology in which a 100 G Ethernet interface can be divided into 20 timeslots, and each timeslot is corresponding to a 5 G bandwidth. The 20 timeslots can be combined into a logical interface based on a preset quantity. For example, the 20 timeslots may be combined into a logical interface with a 10 G, 25 G, 40 G, or 50 G bandwidth. N physical links may further be bonded to implement a flexible combination of N*20 timeslots. In addition, the FlexE does not support transmission crossing multi-hop devices.

The Ethernet technology used by the communications system to which the embodiments of this application are applicable is obtained by extending the FlexE technology. In the Ethernet technology, an Ethernet interface can be divided into a plurality of timeslots, and the plurality of timeslots can be combined into a logical interface based on any quantity. In addition, transmission crossing multi-hop devices can be further implemented in the Ethernet technology.

Figure 1:
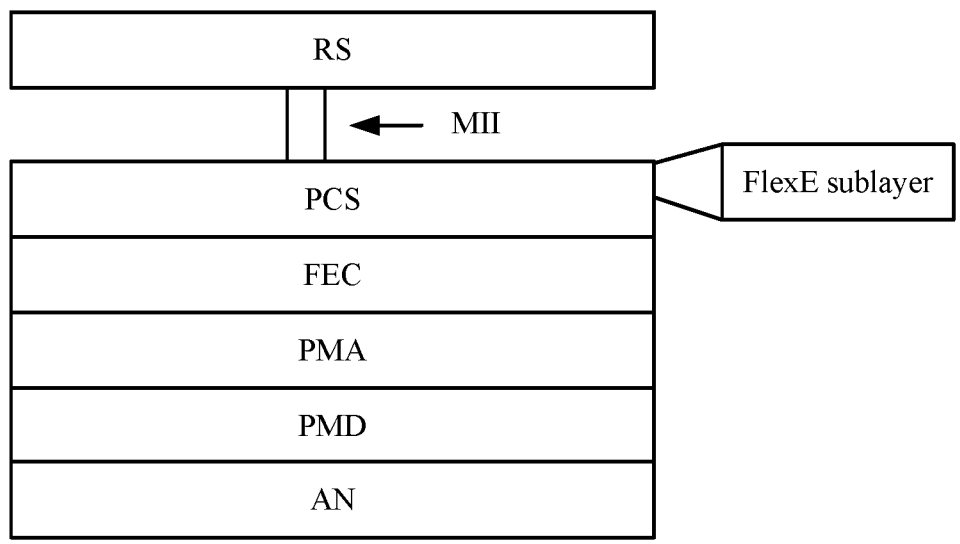
FIG. 1 is a schematic structural diagram of an Ethernet physical layer.

FIG. 1 is a schematic structural diagram of an Ethernet physical layer. As shown in FIG. 1, the physical layer may include a reconciliation sublayer, a media independent interface (MII), a physical coding sublayer (PCS), a forward error correction (FEC) sublayer, a physical medium attachment (PMA) sublayer, a physical medium dependent (PMD) sublayer, and an automatic negotiation (AN) sublayer. The reconciliation sublayer is configured to: perform reconciliation processing to convert an Ethernet frame into MII data; and send the MII data to the PCS by using the MII. The PCS is configured to: perform coding processing (for example, 64B/66B coding), scrambling processing, and the like on the MII data to generate a code block (for example, a 64B/66B code block); and distribute the code block to a logical channel by using the FEC sublayer. The FEC sublayer is configured to add redundant error-correcting code to the code block. Under a specific condition, transmission error code can be automatically corrected through decoding, to reduce a bit error rate of a received signal. The PMA sublayer is configured to implement multiplexing from the logical channel to a physical channel. The PMD sublayer is configured to transmit the physical layer data by using the physical channel. The AN sublayer is configured to enable interconnected devices to perform some function negotiations such as communication rate selection. It should be noted that the Ethernet physical layer may not include the FEC sublayer and the AN sublayer.

A FlexE sublayer is in the PCS, and may be specifically below a coding/decoding module in the PCS. However, this is not limited in this embodiment of this application. Alternatively, the FlexE sublayer may be above a coding/decoding module in the PCS. The coding/decoding module may use a 64B/66B coding technology. However, this is not limited in this embodiment of this application. Alternatively, the coding/decoding module may use another coding technology such as a 256B/257B coding technology. For ease of description, an example in which the coding/decoding module uses the 64B/66B coding technology is used below for description.

The MII may include a 40 G media independent interface (40 Gb/s Media Independent Interface, XLGMII) and a 100 G media independent interface (100 Gb/s Media Independent Interface, CGMII).

Figure 2:
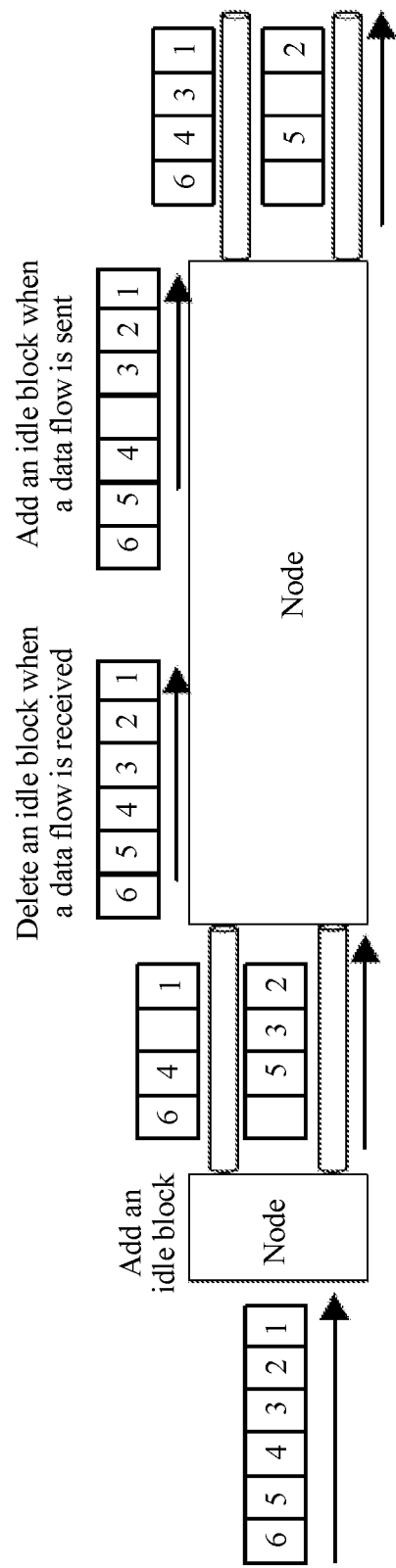
FIG. 2 is a schematic diagram of a communication procedure of a node in a communications system according to an embodiment of this application.

As shown in FIG. 2, when a device in a communications system in an embodiment of this application sends data, for rate matching, the device inserts or deletes a specific quantity of idle blocks or duplicate control blocks into or from a data flow based on a requirement, and then distributes the data flow to a plurality of slots of a channel (channel) corresponding to the data. When the data arrives at a peer device, the peer device aggregates the data received in the plurality of timeslots into a data flow. It should be understood that each device independently inserts an idle block or a duplicate control block, and quantities and locations of idle blocks or duplicate control blocks that are inserted by devices may be different. It should be understood that one channel may be considered as one virtual interface, and the virtual interface may have both an input function and an output function.

Specifically, a source node receives data from one or more inbound interfaces or obtains locally generated data, and aggregates the data to a channel used as an outbound interface, to constitute a data flow. The data flow becomes a code stream with a relatively stable rate after processing such as 64B/66B coding and idle (idle)-block addition/deletion is performed on the data flow. The code stream is distributed to all slots of a channel for forwarding. It should be understood that the outbound interface and/or the inbound interface mentioned in this embodiment of this application may be a virtual interface.

An intermediate node receives data in all the slots of the channel, and then keeps a relative sequence of original data through aggregation and restoration. Then, after performing cross forwarding processing on the data, the intermediate node distributes the data to all slots of a channel, to forward the data. The relative sequence herein is a relative sequence of valid data. To meet a rate matching requirement, an idle block may be added/deducted after the aggregation and restoration.

The intermediate node performs cross forwarding processing based on a unified forwarding rule. Specifically, the intermediate node performs forwarding by using a client (client) as a granularity, and one client is corresponding to one channel. The intermediate node bonds at least one slot with one channel, and then distributes data that is to be sent to a target client to at least one slot bonded with a channel of the target client, to forward the data.

It should be noted that the node shown in FIG. 2 deletes an idle block when receiving a data flow, and adds an idle block when sending a data flow. However, this is not limited in this embodiment of this application. For example, alternatively, the node may not delete an idle block when receiving a data flow, and may not add an idle block when sending a data flow, but may directly forward the received data flow. Alternatively, the intermediate node does not delete an idle block when receiving a data flow, and properly adds or deletes a corresponding quantity of idle blocks based on a rate matching requirement when sending a data flow.

In this embodiment of this application, OAM data may be processed at a FlexE sublayer. In this embodiment of this application, the FlexE sublayer is configured to perform cross forwarding and OAM processing on received data.

In this embodiment of this application, the node may implement the function of the FlexE sublayer. The node may be a forwarding device, for example, may be a switch, or may be a router, a device having an exchanging function, a device having a routing function, or a device having both an exchanging function and a routing function. Nodes may be classified into a source node, an intermediate node, and a destination node.

An embodiment of this application provides an OAM data transmission method. In the method, a source node may add OAM data to a data flow, and a destination node may terminate the OAM data. An intermediate node may forward the data flow that includes the OAM data. Alternatively, an intermediate node may modify OAM data in a corresponding field based on a configured field or a field obtained through negotiation between operators. For example, when detecting fault information, the intermediate node writes the fault information into the corresponding field. Alternatively, an intermediate node may terminate all the OAM data received from an inbound interface, and then, on an outbound interface, re-add some (or all) of the OAM data obtained from the inbound interface and locally detected OAM data to the data flow, and send the data flow.

It should be noted that if a FlexE sublayer is below a coding/decoding module in a PCS, the node in this embodiment of this application inserts an OAM data block into a data flow obtained after 64B/66B coding. The OAM data block is in a form of a 64B/66B code block.

If a FlexE sublayer is above a coding/decoding module in a PCS, the node in this embodiment of this application inserts an OAM data block into a data flow that is based on a coding mode corresponding to an MII, and then, performs 64B/66B coding processing on the data flow by using the coding/decoding module, and sends the data flow. The OAM data block is in a form of data of a plurality of consecutive bytes (byte). For example, the OAM data block is in a form of eight consecutive bytes. Optionally, three of the eight consecutive bytes carry OAM data.

The OAM data transmission method according to the embodiments of this application is described below with reference to FIG. 3 to FIG. 9.

FIG. 3 is a schematic flowchart of an OAM data transmission method 300 according to an embodiment of this application. The method 300 may be performed by a source node or an intermediate node in the communications system. As shown in FIG. 3, the method 300 may include the following content:

310. Obtain a first data flow, where the first data flow includes at least one first OAM data block, and the first OAM data block is a code block that carries first OAM data.

Optionally, the first data flow is a data flow obtained by deleting at least one redundant block or at least one second OAM data block from a second data flow and inserting the at least one first OAM data block, or the first data flow is a data flow obtained by modifying at least one second OAM data block in a second data flow. The second data flow is an aggregated data flow, the second OAM data block carries second OAM data, and the redundant block includes at least one of an idle block and a duplicate control block.

For example, the second data flow is a data flow obtained after a plurality of code blocks received in a plurality of timeslots (slot) of a channel are aggregated. Correspondingly, the first data flow is also an aggregated data flow.

Optionally, if the method 300 is performed by the source node, the first data flow may be locally generated.

320. Send the first data flow.

In this embodiment of this application, OAM data can be transmitted in a communications system that uses a FlexE technology or another Ethernet technology obtained by extending the FlexE.

Optionally, the first data flow may be sent in a plurality of slots of a channel. For example, at least one code block in the first data flow may be sent in each of the plurality of slots of the channel. After receiving code blocks transmitted in the plurality of slots of the channel, a next-hop node may obtain the first data flow through aggregation and restoration.

A relative sequence of valid data blocks in an aggregated data flow is fixed. Therefore, after the next-hop node receives data transmitted in the plurality of timeslots, a relative sequence of valid data blocks in the data flow obtained after the aggregation and restoration processing keeps unchanged. This facilitates OAM data restoration. The valid data blocks herein may include an OAM data block, another data block, and a control block.

Therefore, in this embodiment of this application, OAM data is carried in an aggregated data flow, so that OAM data transmission crossing multi-hop nodes can be implemented.

If a case of performing redundant-block addition/deletion processing on a data flow for rate matching is not considered, a quantity of deleted redundant blocks or second OAM data blocks may be the same as a quantity of inserted first OAM data blocks. However, this is not limited in this embodiment of this application.

In some embodiments, the code block may be a 64B/66B code block.

In some embodiments, the code block may be a code block that is based on a coding format corresponding to an MII. The method 300 is performed by the source node, and the first data flow is the data flow obtained by deleting the at least one redundant block from the second data flow and inserting the at least one first OAM data block. Correspondingly, the sending the first data flow includes:

performing 64B/66B coding processing on the first data flow, to obtain a third data flow; and sending the third data flow.

It should be noted that in this embodiment of this application, alternatively, another coding technology may be used to perform coding processing on the first data flow, to obtain the third data flow. For example, alternatively, 256B/257B coding processing may be performed on the first data flow, to obtain the third data flow.

In some embodiments, the method 300 is performed by the source node. The first data flow is the data flow obtained by deleting the at least one redundant block from the second data flow and inserting the at least one first OAM data block. Correspondingly, the obtaining a first data flow in step 310 includes:

receiving a plurality of code blocks, where the plurality of code blocks include the at least one redundant block;

aggregating the plurality of received code blocks into the second data flow;

generating the at least one first OAM data block; and deleting the at least one redundant block from the second data flow, and inserting the at least one first OAM data block, to obtain the first data flow.

It should be understood that an execution sequence of deleting the at least one redundant block by the source node and inserting the at least one first OAM data block by the source node is not limited in this embodiment of this application. For example, before inserting first OAM data blocks, the source node may delete an enough quantity of redundant blocks in advance to reserve space for the to-be-inserted first OAM blocks, and then insert a same quantity of first OAM data blocks as deleted redundant blocks. Alternatively, the source node may first insert one or more first OAM blocks at places where first OAM blocks need to be inserted, record a quantity of redundant blocks that further need to be deleted, and delete the same quantity of redundant blocks. It should be understood that in some embodiments, to meet rate matching, redundant-block addition or deletion may be continued before the first data flow is sent.

In some embodiments, the method 300 is performed by the intermediate node. The first data flow is the data flow obtained by deleting the at least one second OAM data block from the second data flow and inserting the at least one first OAM data block. Correspondingly, the obtaining a first data flow in step 310 includes:

receiving a plurality of code blocks, where the plurality of code blocks include the at least one second OAM data block;

aggregating the plurality of received code blocks into the second data flow;

generating the at least one first OAM data block; and deleting the at least one second OAM data block from the second data flow, and inserting the at least one first OAM data block, to obtain the first data flow.

It should be understood that in this embodiment of this application, the intermediate node may first delete the at least one second OAM data block from the second data flow, and then insert the at least one first OAM data block. It should be noted that in this embodiment of this application, the OAM data carried in the at least one first OAM data block may include locally detected fault information, and may further include the OAM data carried in the at least one second OAM data block.

It should be noted that the plurality of code blocks received by the source node or the intermediate node may further include at least one data block and/or at least one control block. Correspondingly, the first data flow may further include the at least one data block and/or the at least one control block. The data block may be a code block that carries valid data such as service data.

Optionally, the deleting the at least one redundant block or the at least one second OAM data block from the second data flow, and inserting the at least one first OAM data block includes:

deleting the at least one redundant block or the at least one second OAM data block from the first data flow, and periodically inserting the at least one first OAM data block.

In other words, the source node or the intermediate node may periodically insert the at least one first OAM data block. For example, the source node or the intermediate node may insert one first OAM code block at an interval of a preset quantity of (for example, 2048) code blocks.

The periodically inserting the at least one first OAM data block facilitates a receive end in determining whether a communication link is faulty. For example, if the receive end receives, within one or more periods, no OAM data block sent by a peer end, the receive end may consider that the communication link is faulty.

In addition, in this embodiment of this application, a code block that carries OAM data is periodically inserted at a PCS layer, so that indicators such as a delay and a jitter can be well measured.

For example, the source node may search, at the start of each period (for example, at an interval of 2048 code blocks), for an idle block or a duplicate control block that can be deleted, delete the idle block or the duplicate control block, and record the idle block or the duplicate control block in the system. Then, the source node inserts an OAM block behind a last but one code block (for example, a $2047^{th}$ code block) within each period.

The intermediate node may delete all the at least one second OAM data block that is in the second data flow and that is received on an inbound interface, and then, on an outbound interface, periodically insert the at least one first OAM data block into the data flow, and send the data flow. To meet rate matching, redundant-block addition/deletion processing may be further performed before the data flow is sent.

In some embodiments, the method 300 is performed by the source node. Correspondingly, the deleting the at least one redundant block from the first data flow, and periodically inserting the at least one first OAM data block includes: deleting one redundant block and inserting one first OAM data block within one period.

It should be understood that a location of the deleted redundant block in the data flow may be different from or may be the same as a location of the inserted first OAM data block in the data flow.

In some embodiments, the method 300 is performed by the intermediate node, and the first data flow is the data flow obtained by modifying the second OAM data block in the second data flow. Correspondingly, the obtaining a first data flow in step 310 includes:

receiving a plurality of code blocks, where the plurality of code blocks include the at least one second OAM data block;

aggregating the plurality of received code blocks into the second data flow; and modifying some or all second OAM data blocks in the second data flow, to obtain the first data flow.

In this embodiment of this application, a to-be-modified OAM data block in the second data flow is described as the second OAM data block, and a modified OAM data block in the first data flow is described as the first OAM data block.

It should be understood that all the second OAM data blocks in the second data flow may be modified to obtain the first data flow. In this case, all first OAM data blocks in the first data flow are different from all the second OAM data blocks in the second data flow.

It should further be understood that alternatively, some second OAM data blocks in the second data flow may be modified to obtain the first data flow. In this case, some first OAM data blocks in the first data flow are the same as some second OAM data blocks in the second data flow.

Optionally, the modifying the at least one second OAM data block in the second data flow includes:

determining a target field that is in the at least one second OAM data block in the second data flow and that needs to be modified; and modifying OAM data in the target field, to obtain the first data flow.

In some embodiments, the method 300 is performed by the intermediate node. Correspondingly, the obtaining a first data flow in step 310 includes:

receiving a plurality of code blocks; and aggregating the plurality of received code blocks into the first data flow.

In other words, the intermediate node may directly forward a data flow that carries OAM data, without modifying the OAM data carried in the data flow. It should be understood that to meet rate matching, the intermediate node may further perform redundant-block addition/deletion processing on the data flow before forwarding the data flow.

It should be understood that the code block received by the intermediate node is a 64B/66B code block.

Optionally, the OAM data in this embodiment of this application may include a faulty-node identifier and an error flag.

The faulty-node identifier may be a faulty-node address. The address may be an Internet Protocol version 4 (IPv4) address, an Internet Protocol version 6 (IPv6) address, or a Media Access Control (MAC) address, or may be any other character string.

The error flag may include a forward error flag and a backward error (Backward Error) flag.

Optionally, the OAM data in this embodiment of this application may further include an error type, bit error rate detection information, and a bidirectional delay and jitter measurement flag. The error type may include a decoding error, a link interruption, or the like. The bit error rate detection information may be bit interleaved parity-8 (BIP-8).

During actual deployment, one service may need to pass through networks of a plurality of operators. In this case, each operator needs to perform OAM detection on the service, and report an alarm to a network management system of a corresponding operator in time when finding a problem. Therefore, full-path detection can be implemented, to find and locate the problem in time. In some embodiments, region-based/segment-based OAM detection is allowed. For example, in a scenario of crossing a plurality of operators, each operator may independently perform detection at a level/interval. When an error is detected in a region-based/segment-based manner, related detection information needs to be sent, to facilitate cross-interval error notification. Therefore, the first OAM data may further include an OAM detection result recorded by a node device of at least one operator.

Figure 4:
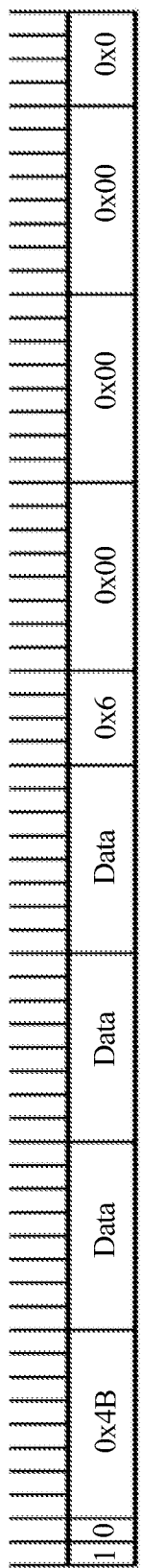
FIG. 4 is a schematic structural diagram of a 64B/66B code block.

The OAM data block in this embodiment of this application is described below with reference to FIG. 4 by using the 64B/66B code block as an example.

64B/66B coding is coding 64-bit (bit) data or control information into a 66-bit block for transmission. First two bits in the 66-bit block represent a synchronization header that is mainly used for data alignment of the receive end and synchronization of received data bit streams. The synchronization header is of two types: "01" and "10". "01" indicates that all 64 bits behind the first two bits are data, and "10" indicates that 64 bits behind the first two bits are a combination of data and control information. In this embodiment of this application, a 64B/66B code block whose synchronization header is "10" is used to carry OAM data. FIG. 4 is a schematic structural diagram of a 64B/66B code block. "0x6" is to be acknowledged and allocated by a standard organization, and "10", "0x4B", "0x00", "0x0", and the like are all preset fields with fixed values.

In this embodiment of this application, the OAM data may be carried in a data (Data) field in the code block. The code block may be identified as the OAM data block by using the field "10", "0x4B", or "0x6".

Because limited OAM data can be carried in one OAM data block, when there is a relatively large amount of OAM data, one OAM data block cannot carry the OAM data that needs to be transmitted. Therefore, a plurality of OAM data blocks may be combined into one OAM frame to carry more OAM data. For example, eight OAM data blocks may be combined into one OAM frame. It should be understood that OAM data blocks in an OAM frame may be separated by another data block and/or a redundant block in a data flow.

The OAM frame may include information such as a frame start flag, bidirectional delay and jitter measurement information, forward error information, backward error information, fault type information, a faulty-node identifier, and bit error rate detection information. The bit error rate detection information may be the BIP-8. It should be noted that in this embodiment of this application, a frame structure of the OAM frame is not limited, and a corresponding field used to fill corresponding information may be defined in the OAM frame.

A plurality of OAM frames may further be combined into an OAM multiframe, to further carry more OAM data. For example, 16 to 64 OAM frames may be combined into an OAM multiframe. Correspondingly, the OAM frame may further include a multiframe flag field.

Further, the OAM frame may further include a multiframe start flag and segment-based/region-based fault detection information. The segment-based/region-based fault detection information may include a source address, a destination address, bidirectional delay and jitter measurement information, forward error information, backward error information, a fault type, and bit error rate detection information of each segment-based/region-based node device.

Figure 5:
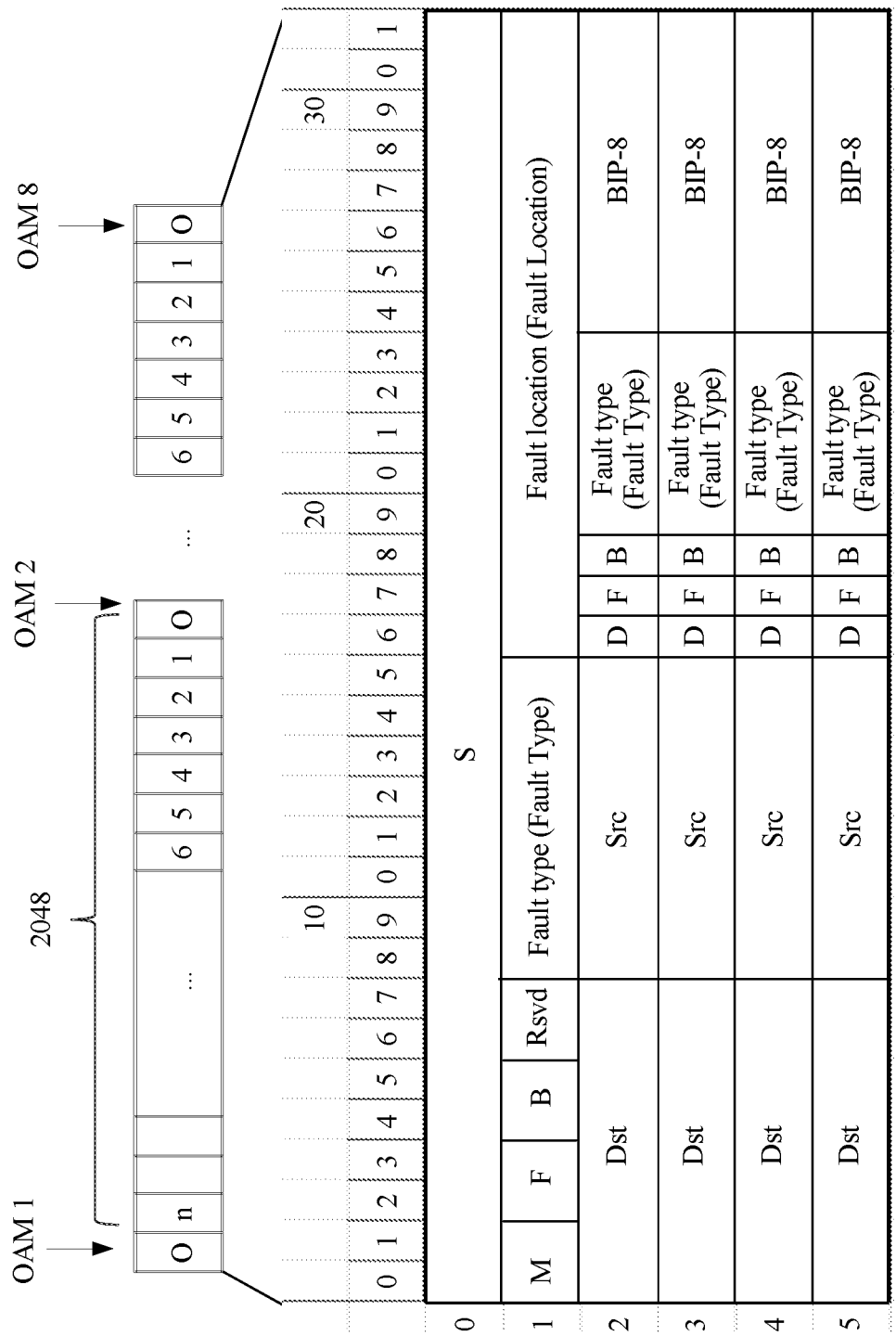
FIG. 5 is a schematic structural diagram of an OAM frame according to an embodiment of this application.

FIG. 5 is a schematic structural diagram of an OAM frame. A block "0" in FIG. 5 represents a 64B/66B code block used to carry OAM data. In FIG. 5, only an OAM frame that includes eight OAM data blocks is used as an example for description. Because three bytes in one OAM data block are used to carry OAM data, a total of 24 bytes in the OAM frame that includes the eight OAM data blocks are used to carry OAM data. A row in the OAM frame structure shown in FIG. 5 includes 32 bits, namely, four bytes.

Meanings of fields shown in FIG. 5 are described as follows:

"S" represents a frame start (Start) flag bit.

"M" represents a multiframe (MultiFrame) flag bit. For example, "1" identifies the start of a multiframe.

"D" represents a bidirectional delay and jitter measurement flag bit. When starting a test, an OAM initiator may modify a value of the flag bit, for example, modify the value from "0" to "1" or modify the value from "1" to "0", and start timing. The value remains unchanged during the test, and a peer device returns the data. When detecting that the flag bit changes, the initiator may calculate a delay.

"F" represents a forward error (Forward Error) flag bit that indicates that an error occurs in an upstream.

"B" represents a forward error (Backward Error) flag bit that indicates that an error occurs in a reverse link.

A fault type (Fault Type) includes a decoding error, a link interruption, and the like.

"Dst" represents a destination address.

"Src" represents a source address.

A fault location (Fault Location) represents a faulty-node address.

BIP-8 is used to detect a bit error rate.

In the frame structure shown in FIG. 5, a first row is used to record fault information or global information that needs cross-interval notification. A second row to a fifth row are used to record fault detection information of a node of each operator.

It should be noted that in the frame structure shown in FIG. 5, first 32 bits of the OAM frame are used as a start flag field of the OAM frame. However, this is not limited in this embodiment of this application. Alternatively, another quantity of first bits of the OAM frame may be used as a start flag field of the OAM frame. When the start flag field of the OAM frame occupies a plurality of bits, bits occupied by other fields in the OAM frame may be correspondingly modified. A quantity of bits occupied by each field in the OAM frame is not limited in this embodiment of this application.

The setting the start flag field of the OAM frame in an OAM data part of the OAM data frame to identify the start of the OAM frame is described above. However, in this embodiment of this application, alternatively, the start of the OAM frame may be identified in another manner. For example, a third field and a seventh field in an OAM data block may be used to respectively carry "0x4B" and "0x6", to identify the start of an OAM frame. A third field and a seventh field in each of a second OAM data block to an eighth OAM data block in the OAM frame respectively carry "0x4B" and "0x7".

FIG. 6 is a schematic flowchart of an OAM data transmission method 600 according to an embodiment of this application. The method 600 may be performed by a destination node in a communications system. As shown in FIG. 6, the method 600 may include the following content:

610. Receive a plurality of code blocks, where the plurality of code blocks include at least one OAM data block, and the OAM data block is a code block that carries OAM data.

620. Aggregate the plurality of received code blocks into a first data flow.

630. Delete the at least one OAM data block from the first data flow, and insert at least one redundant block, to obtain a second data flow, where the redundant block includes at least one of an idle block and a duplicate control block.

640. Send the second data flow.

In this embodiment of this application, OAM data can be transmitted in a communications system that uses a FlexE technology or another Ethernet technology obtained by extending the FlexE.

Optionally, the second data flow may be sent in a plurality of timeslots of a channel.

A relative sequence of valid data blocks in an aggregated data flow is fixed. Therefore, after a next-hop node receives data transmitted in the plurality of timeslots, a relative sequence of valid data blocks in a data flow obtained after aggregation and restoration processing keeps unchanged. This facilitates OAM data restoration. The valid data blocks herein may include an OAM data block, another data block, and a control block.

Therefore, in this embodiment of this application, OAM data is carried in an aggregated data flow, so that OAM data transmission crossing multi-hop nodes can be implemented.

Optionally, the plurality of code blocks received in step 610 may further include at least one data block. Correspondingly, the second data flow may further include the at least one data block. The data block may carry valid data such as service data.

Optionally, if a case of performing redundant-block addition/deletion processing on a data flow for rate matching is not considered, a quantity of deleted OAM data blocks may be the same as a quantity of inserted redundant blocks.

However, this is not limited in this embodiment of this application.

Optionally, in some embodiments, to meet rate matching, redundant-block addition/deletion processing may be further performed on the second data flow before the second data flow is sent.

Optionally, the code block is a 64B/66B code block.

An OAM data transmission method according to an embodiment of this application is described below with reference to FIG. 7 to FIG. 9.

Figure 7:
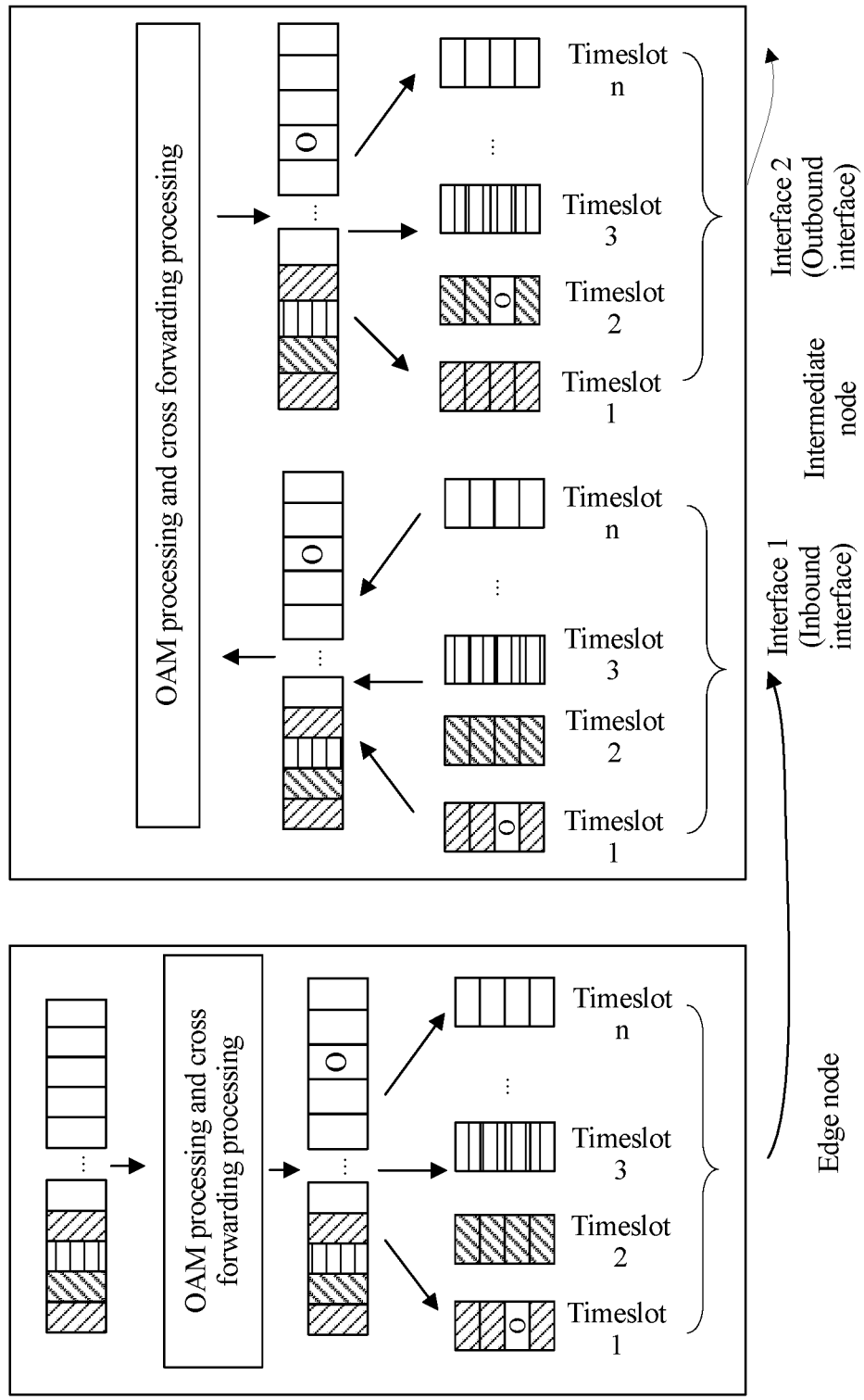
FIG. 7 is a schematic flowchart of an OAM data transmission method according to another embodiment of this application.
Figure 8:
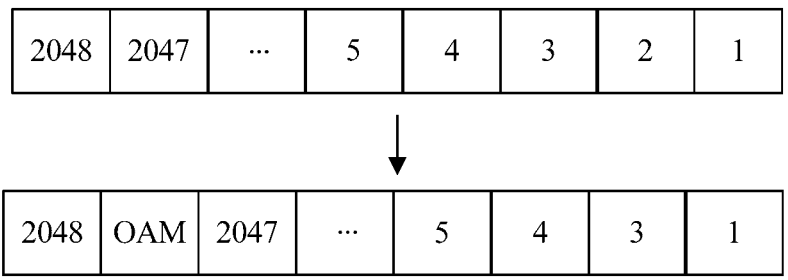
FIG. 8 is a schematic diagram of performing OAM processing by a source node according to an embodiment of this application.

In FIG. 7, a slot 0 to a slot n may be slots in M physical links in a flexible Ethernet group (FlexE group). In an example in which a 100 G Ethernet interface is divided into 20 timeslots (slot), a total quantity of slots in the M physical links is n+1=M*20.

After aggregating data received in a plurality of slots into a data flow, a source node may perform 64B/66B coding processing on the data flow, and then perform OAM processing on a data flow obtained after the coding processing, to be specific, insert an OAM data block into the data flow. In addition, the source node may perform cross forwarding processing, determine a virtual outbound interface of the data flow, and distribute the data flow to n timeslots bonded with the virtual outbound interface. "0" in FIG. 7 represents an OAM data block.

The source node may periodically insert the OAM data block into the coded and aggregated data flow. Some fields in the OAM data block such as a related field reserved for supporting region-based/segment-based OAM may be reserved. An intermediate node may write locally detected OAM data into these reserved fields.

As described above, the source node may insert one OAM data block at an interval of 2048 64/66B code blocks. In some embodiments, an enough quantity of idle blocks or duplicate control blocks are deleted in advance to reserve space for OAM data blocks, and then the OAM data blocks are inserted. For example, an idle block that can be deleted may be searched for at the start of each period (at an interval of 2048 blocks), the idle block may be deleted, and the idle block may be recorded in the system. Then, as shown in FIG. 8, an OAM data block is inserted behind a 2047th block. It should be noted that when the OAM data block is inserted, a boundary of an Ethernet frame may not need to be considered, and the OAM data block does not need to be inserted after a frame ends and may be absolutely inserted in the middle of the frame. An insertion location depends only on a quantity of 64B/66B code blocks and locations of the 64B/66B code blocks.

In some embodiments, there is a jumbo frame (Jumbo Frame) in a switch or a router. If data such as a frame preamble is not considered, a length of the jumbo frame is 9000 bytes that is approximately 1125 64/66B blocks. In this case, if a user sends data at a full rate, a relatively small quantity of idle blocks can be deleted within each period. If another application also needs an idle code block, it cannot be ensured that a proper idle block can be found in each frame to vacate a location for an OAM data block. In this case, the source node may first insert one or more OAM data blocks at places where OAM blocks need to be inserted, record a corresponding quantity of idle blocks that are further to be deleted before an overall rate balance can be implemented, and may additionally delete the corresponding quantity of idle blocks within a next period.

In addition, idle-block deletion or addition may be performed in a unit of eight bytes, or may be performed in a unit of one 64/66B code block. After the deletion, at least one idle byte can be reserved between frames.

As shown in FIG. 7, the intermediate node performs aggregation processing on code blocks received on a virtual inbound interface 1, to obtain a data flow that includes an OAM data block. Then, the intermediate node performs OAM processing and cross forwarding processing, determines a virtual outbound interface of the data flow, and distributes the data flow to n timeslots bonded with the virtual outbound interface 2. That the intermediate node performs OAM processing includes as follows: The intermediate node modifies OAM data carried in the OAM data block in the data flow; or the intermediate node first deletes the OAM data block from the data flow, and then inserts a new OAM data block; or the intermediate node writes new OAM data into the OAM data block in the data flow.

When processing the OAM data, the intermediate node may write corresponding data into proper (several) OAM data blocks based on an OAM frame structure. For example, when a problem is found in an OAM domain, error information may be written into a corresponding field in an OAM frame. It should be understood that there is no completely consecutive OAM frame in the data flow in this embodiment of this application. Therefore, the OAM data may be written in a unit of one 64B/66B code block or in a unit of eight bytes.

In addition, because there is a rate difference between devices, the intermediate forwarding node may further add or delete an idle block before sending the data flow that includes the OAM data block, to implement rate matching.

Figure 9:
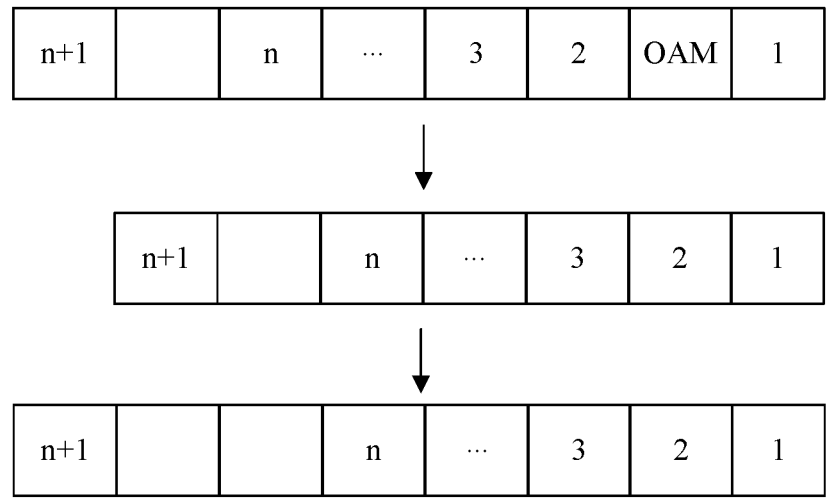
FIG. 9 is a schematic diagram of performing OAM processing by a source node according to an embodiment of this application.

As shown in FIG. 9, when obtaining the OAM data in the OAM data block, a destination node deletes the OAM data block from the data flow, and supplements a proper quantity of idle blocks at idle locations. It should be noted that because a relative sequence of valid data in a data flow is unchanged, inserting a proper quantity of idle blocks at corresponding locations has no impact on correctly processing the data flow by an upper layer.

The destination node may aggregate data received in slots into a data flow, and then, extract OAM data from the data flow, and independently process the OAM data. After extracting the OAM data, the destination node may delete an OAM data block from the data flow, and then, search for a boundary of an Ethernet frame along the data flow, and insert, on the boundary, a same quantity of idle data blocks or control blocks as deleted OAM data blocks. The boundary of the Ethernet frame may be identified by using an idle block, a frame terminate (Terminate) block, or the like.

Figure 10:
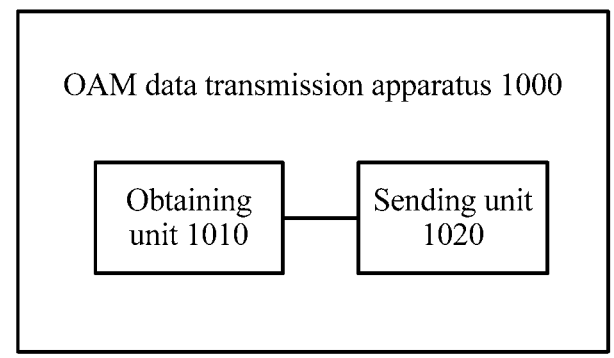
FIG. 10 is a schematic structural diagram of an OAM data transmission apparatus according to an embodiment of this application.

FIG. 10 is a schematic structural diagram of an OAM data transmission apparatus 1000 according to an embodiment of this application. The apparatus 1000 may be corresponding to the source node or the intermediate node in the method 300. As shown in FIG. 10, the apparatus 1000 may include an obtaining unit 1010 and a sending unit 1020.

The obtaining unit 1010 is configured to obtain a first data flow. The first data flow includes at least one first OAM data block, and the first OAM data block is a code block that carries first OAM data.

Optionally, the first data flow is a data flow obtained by deleting at least one redundant block or at least one second OAM data block from a second data flow and inserting the at least one first OAM data block, or the first data flow is a data flow obtained by modifying at least one second OAM data block in a second data flow. The second data flow is an aggregated data flow, the second OAM data block carries second OAM data, and the redundant block includes at least one of an idle block and a duplicate control block.

Optionally, if the apparatus 1000 is corresponding to the source node in the method 300, the first data flow may be locally generated. Correspondingly, the obtaining unit 1010 is specifically configured to generate the first data flow.

The sending unit 1020 is configured to send the first data flow obtained by the obtaining unit.

Optionally, the sending unit 1020 may send the first data flow in a plurality of timeslots (slot) of a channel (channel).

A relative sequence of valid data blocks in an aggregated data flow is fixed. Therefore, after a next-hop node receives data transmitted in the plurality of timeslots, a relative sequence of valid data blocks in a data flow obtained after aggregation and restoration processing keeps unchanged. This facilitates OAM data restoration. The valid data blocks herein may include an OAM data block, another data block, and a control block.

Therefore, in this embodiment of this application, OAM data is carried in an aggregated data flow, so that OAM data transmission crossing multi-hop nodes can be implemented.

Optionally, the first OAM data and the second OAM data each include a faulty-node identifier and an error flag.

Optionally, the code block is a 64B/66B code block.

Figure 11:
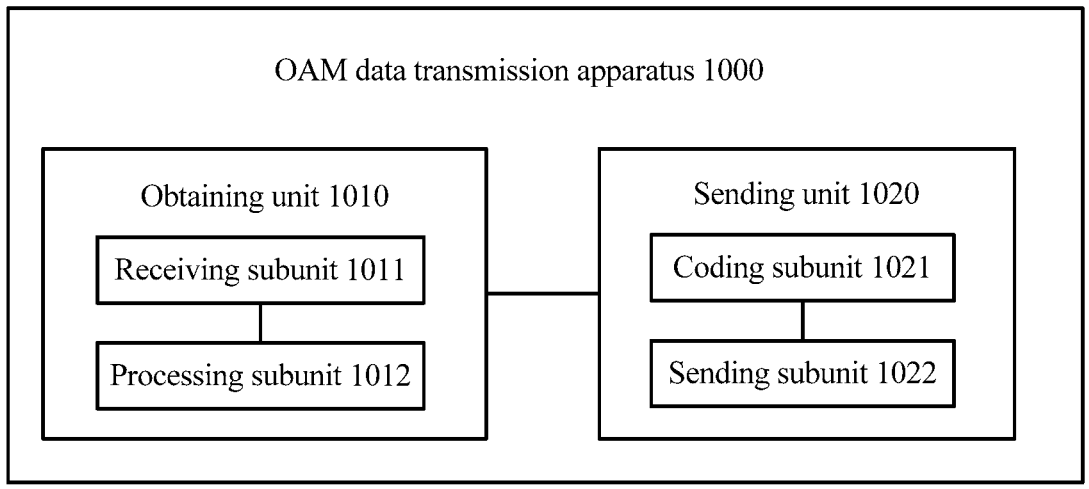
FIG. 11 is a schematic structural diagram of an OAM data transmission apparatus according to another embodiment of this application.

As shown in FIG. 11, the obtaining unit 1010 may include a receiving subunit 1011 and a processing subunit 1012.

In some embodiments, the first data flow is the data flow obtained by deleting the at least one redundant block or the at least one second OAM data block from the second data flow and inserting the at least one first OAM data block. Correspondingly, the receiving subunit 1011 is configured to receive a plurality of code blocks, and the plurality of code blocks include the at least one redundant block or the at least one second OAM data block. The processing subunit 1012 is configured to: aggregate the plurality of code blocks received by the receiving subunit 1011 into the second data flow; generate the at least one first OAM data block; and delete the at least one redundant block or the at least one second OAM data block from the second data flow, and insert the at least one first OAM data block, to obtain the first data flow.

The processing subunit 1012 may be further specifically configured to: delete the at least one redundant block or the at least one second OAM data block from the second data flow, and periodically insert the at least one first OAM data block.

Further, the processing subunit 1012 may be further specifically configured to delete one redundant block and insert one first OAM data block within one period.

In some embodiments, the first data flow is the data flow obtained by modifying the second OAM data block in the second data flow. Correspondingly, the receiving subunit 1011 is configured to receive a plurality of code blocks, and the plurality of code blocks include the at least one second OAM data block. The processing subunit 1012 is configured to aggregate the plurality of code blocks received by the receiving subunit 1011 into the second data flow. The processing subunit is further configured to modify some or all second OAM data blocks in the second data flow, to obtain the first data flow.

The processing subunit 1011 may be specifically configured to:

determine a target field that is in the at least one second OAM data block in the second data flow and that needs to be modified; and modify OAM data in the target field.

In some embodiments, the first data flow is the data flow obtained by deleting the at least one redundant block from the second data flow and inserting the at least one first OAM data block, and the code block is a code block that is based on a coding format corresponding to a media independent interface MII. Correspondingly, as shown in FIG. 11, the sending unit 1020 may include a coding subunit 1021, configured to perform 64B/66B coding processing on the first data flow, to obtain a third data flow; and a sending subunit 1022, configured to send the third data flow.

It should be understood that the apparatus 1000 according to this embodiment of this application may be corresponding to the source node or the intermediate node in the method 300 according to the embodiments of this application, and the foregoing and other operations and/or functions of the modules in the apparatus 1000 are separately configured to implement the corresponding procedures in the method 300 shown in FIG. 3. For clarity, details are not described herein again.

Figure 12:
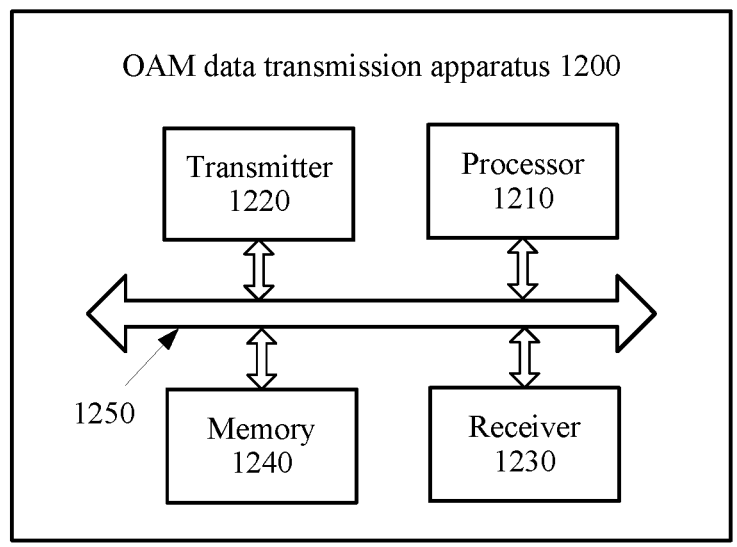
FIG. 12 is a schematic structural diagram of an OAM data transmission apparatus according to another embodiment of this application.

FIG. 12 is a schematic structural diagram of an OAM data transmission apparatus 1200 according to another embodiment of this application. As shown in FIG. 12, the apparatus 1200 includes a processor 1210, a transmitter 1220, a memory 1240, and a bus system 1250. The processor 1210, the transmitter 1220, and the memory 1240 are connected by using the bus system 1250. The memory 1240 may be configured to store code and the like executed by the processor 1210. The transmitter 1220 may be configured to send a signal under control of the processor 1210.

In some embodiments, the processor 1210 may be configured to implement the function of the obtaining unit 1010 in the apparatus 1000 shown in FIG. 10, and the transmitter 1220 is configured to implement the function of the sending unit 1020 in the apparatus 1000.

Optionally, the apparatus 1200 may further include a receiver 1230. The receiver 1230 may be configured to receive a signal under control of the processor 1210.

In some embodiments, the processor 1210 may be configured to implement the function of the processing subunit 1012 in the apparatus 1000 shown in FIG. 11, the receiver 1230 is configured to implement the function of the receiving subunit 1011, and the transmitter 1220 is configured to implement the function of the sending unit 1020 in the apparatus 1000.

In some embodiments, the processor 1210 may be configured to implement the functions of the processing subunit 1012 and the coding subunit 1021 in the apparatus 1000 shown in FIG. 11, the receiver 1230 is configured to implement the function of the receiving subunit 1011, and the transmitter 1220 is configured to implement the function of the sending subunit 1022.

It should be understood that the apparatus 1200 according to this embodiment of this application may be corresponding to the source node or the intermediate node in the method 300 according to the embodiments of this application and the apparatus 1000 according to the embodiments of this application, and the foregoing and other operations and/or functions of the modules in the apparatus 1200 are separately configured to implement the corresponding procedures in the method 300 shown in FIG. 3. For clarity, details are not described herein again.

Figure 13:
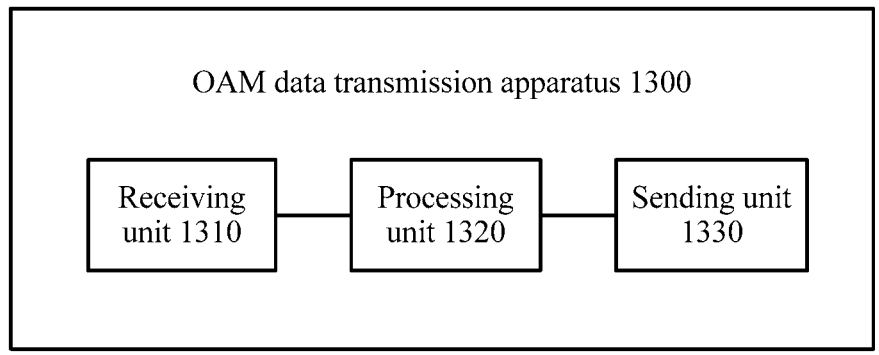
FIG. 13 is a schematic structural diagram of an OAM data transmission apparatus according to another embodiment of this application.

FIG. 13 is a schematic structural diagram of an OAM data transmission apparatus 1300 according to another embodiment of this application. The apparatus 1300 may be corresponding to the destination node in the method 600 shown in FIG. 6. As shown in FIG. 13, the apparatus 1300 includes a receiving unit 1310, a processing unit 1320, and a sending unit 1330.

The receiving unit 1310 is configured to receive a plurality of code blocks. The plurality of code blocks include at least one OAM data block, and the OAM data block is a code block that carries OAM data.

The processing unit 1320 is configured to aggregate the plurality of received code blocks into a first data flow, and is further configured to: delete the at least one OAM data block from the first data flow, and insert at least one redundant block, to obtain a second data flow. The redundant block includes at least one of an idle block and a duplicate control block.

The sending unit 1330 is configured to send the second data flow.

Optionally, the code block is a 64B/66B code block.

Figure 14:
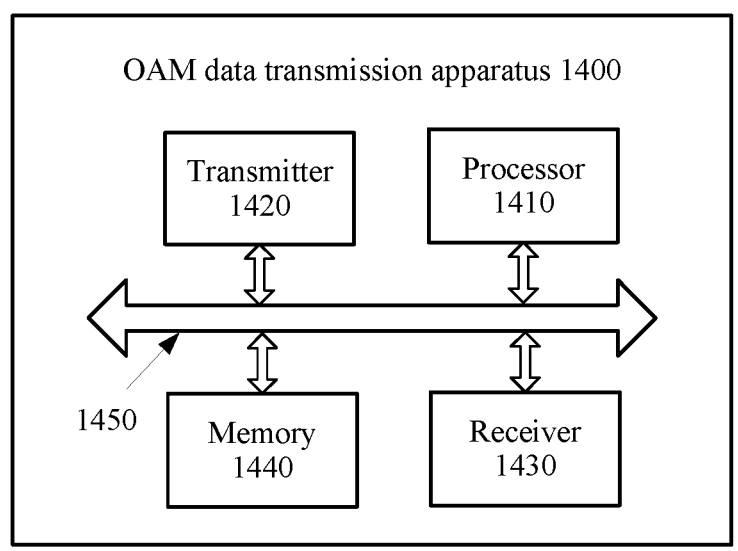
FIG. 14 is a schematic structural diagram of an OAM data transmission apparatus according to another embodiment of this application.

FIG. 14 is a schematic structural diagram of an OAM data transmission apparatus 1400 according to another embodiment of this application. As shown in FIG. 14, the apparatus 1400 includes a processor 1410, a transmitter 1420, a receiver 1430, a memory 1440, and a bus system 1450. The processor 1410, the transmitter 1420, the receiver 1430, and the memory 1440 are connected by using the bus system 1450. The memory 1440 may be configured to store code and the like executed by the processor 1410. The transmitter 1420 may be configured to send a signal under control of the processor 1410, and the receiver 1430 may be configured to receive a signal under control of the processor 1410.

Specifically, the processor 1410 may be configured to implement the function of the processing unit 1320 in the apparatus 1300 shown in FIG. 13, the receiver 1430 is configured to implement the function of the receiving unit 1310, and the transmitter 1420 is configured to implement the function of the sending unit 1330.

It should be understood that the apparatus 1400 according to this embodiment of this application may be corresponding to the destination node in the method 600 according to the embodiments of this application and the apparatus 1300 according to the embodiments of this application, and the foregoing and other operations and/or functions of the modules in the apparatus 1400 are separately configured to implement the corresponding procedures in the method 600 shown in FIG. 6. For clarity, details are not described herein again.

It should be noted that the bus system in the foregoing embodiments may further include a power bus, a control bus, and a status signal bus in addition to a data bus. For ease of representation, various buses are marked as the bus system in the figure.

The memory in the foregoing embodiments may include a volatile memory (volatile memory) such as a random access memory (random access memory, RAM). Alternatively, the memory may include a nonvolatile memory (nonvolatile memory) such as a flash memory (flash memory), a hard disk drive (hard disk drive, HDD), or a solid-state drive (solid-state drive, SSD). Alternatively, the memory may include a combination of the foregoing types of memories.

The processor in the foregoing embodiments may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logical device (complex programmable logical device, CPLD), a field programmable gate array (field programmable gate array, FPGA), generic array logic (generic array logic, GAL), or any combination thereof.

In the embodiments of this application, "first" and "second" are merely used for distinguishing, and do not mean a sequence or a size.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clear understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one place, or may be distributed on a plurality of network units. Some or all of the units may be selected based on an actual requirement, to achieve the objectives of the solutions in the embodiments.

In addition, the function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An operation, administration and maintenance (OAM) data transmission method, comprising:
   obtaining, by a first node, a first data flow of a client;
   inserting, by the first node, an OAM data block in the first data flow of the client to obtain a second data flow of the client, wherein the OAM data block is a 64B/66B code block that carries OAM data, and wherein the OAM data is used for OAM detection of the client; and
   distributing, by the first node, the second data flow of the client to at least one slot of a channel corresponding to the client.

2. The method according to claim 1, wherein the client is an Ethernet client, and wherein the first two bits in the 64B/66B code block represent a synchronization header.

3. The method according to claim 1, wherein before the distributing step, the method further comprising:
   performing, by the first node, idle block addition/deletion on the second data flow of the client.

4. The method according to claim 1, wherein a slot of the channel corresponding to the client is one of a plurality of slots of M physical links of the first node.

5. The method according to claim 4, wherein each physical link of the M physical links is a 100G physical link, and wherein each physical link of the M physical links comprises 20 slots.

6. An operation, administration and maintenance (OAM) data transmission method, comprising:
   receiving, by a second node, a second data flow of a client from at least one slot of a channel corresponding to the client, wherein the second data flow of the client comprise an OAM data block, wherein the OAM data block is a 64B/66B code block that carries OAM data, and wherein the OAM data is used for OAM detection of the client;
   detecting, by the second node, OAM of the client according to the OAM data block; and
   deleting, by the second node, the OAM data block from the second data flow to obtain a first data flow of the client.

7. The method according to claim 6, wherein the client is an Ethernet client, and wherein the first two bits in the 64B/66B code block represent a synchronization header.

8. The method according to claim 6, wherein before the detecting step, the method further comprising:
   performing, by a first node, idle block addition/deletion on the second data flow of the client.

9. The method according to claim 6, wherein a slot of the channel corresponding to the client is one of a plurality of slots of M physical links of a first node.

10. The method according to claim 9, wherein each physical link of the M physical links is a 100G physical link, and wherein each physical link of the M physical links comprises 20 slots.

11. An operation, administration and maintenance (OAM) data transmission apparatus, comprising:
    at least one processor; and
    one or more memories coupled to the at least one processor and storing programming instructions for execution by the at least one processor to:
    obtain a first data flow of a client;
    insert an OAM data block in the first data flow of the client to obtain a second data flow of the client, wherein the OAM data block is a 64B/66B code block that carries OAM data, and wherein the OAM data is used for OAM detection of the client; and
    distribute the second data flow of the client to at least one slot of a channel corresponding to the client.

12. The apparatus according to claim 11, wherein the client is an Ethernet client, and wherein the first two bits in the 64B/66B code block represent a synchronization header.

13. The apparatus according to claim 11, wherein the programming instructions are for execution by the at least one processor to performing idle block addition/deletion on the second data flow of the client.

14. The apparatus according to claim 11, wherein a slot of the channel corresponding to the client is one of a plurality of slots of M physical links of a first node.

15. The apparatus according to claim 14, wherein each physical link of the M physical links is a 100G physical link, and wherein each physical link of the M physical links comprises 20 slots.

16. An operation, administration and maintenance (OAM) data transmission apparatus, comprising at least one processor and one or more memories coupled to the at least one processor and storing programming instructions for execution by the at least one processor to perform operations comprising:
- receiving, by a second node, a second data flow of a client from at least one slot of a channel corresponding to the client, wherein the second data flow of the client comprise an OAM data block, wherein the OAM data block is a 64B/66B code block that carries OAM data, and wherein the OAM data is used for OAM detection of the client;
- detecting, by the second node, OAM of the client according to the OAM data block; and
- deleting, by the second node, the OAM data block from the second data flow to obtain a first data flow of the client.

17. The apparatus according to claim 16, wherein the client is an Ethernet client, and wherein the first two bits in the 64B/66B code block represent a synchronization header.

18. The apparatus according to claim 16, wherein the programming instructions are for execution by the at least one processor to perform idle block addition/deletion on the second data flow of the client.

19. The apparatus according to claim 16, wherein a slot of the channel corresponding to the client is one of a plurality of slots of M physical links of a first node.

20. The apparatus according to claim 19, wherein each physical link of the M physical links is a 100G physical link, and wherein each physical link of the M physical links comprises 20 slots.

* * * * *